United States Patent
Udassin et al.

(10) Patent No.: US 10,454,672 B2
(45) Date of Patent: Oct. 22, 2019

(54) SYSTEMS AND METHODS FOR PREVENTING SESSION FIXATION OVER A DOMAIN PORTAL

(71) Applicant: Facebook, Inc., Menlo Park, CA (US)

(72) Inventors: Roy Udassin, Givaataim (IL); Erling Alf Ellingsen, Mountain View, CA (US); Itay Duvdevani, HaAyin (IL); Oren Hafif, London (GB)

(73) Assignee: Facebook, Inc., Menlo Park, CA (US)

( * ) Notice: Subject to any disclaimer, the term of this patent is extended or adjusted under 35 U.S.C. 154(b) by 331 days.

(21) Appl. No.: 15/605,563

(22) Filed: May 25, 2017

(65) Prior Publication Data
US 2018/0343113 A1   Nov. 29, 2018

(51) Int. Cl.
*H04L 29/06*   (2006.01)
*H04L 9/08*    (2006.01)
*H04L 9/14*    (2006.01)
*H04L 9/32*    (2006.01)

(52) U.S. Cl.
CPC .......... *H04L 9/0822* (2013.01); *H04L 9/0861* (2013.01); *H04L 9/0894* (2013.01); *H04L 9/14* (2013.01); *H04L 9/3226* (2013.01); *H04L 9/3242* (2013.01); *H04L 63/14* (2013.01)

(58) Field of Classification Search
CPC . H04L 63/14; H04L 63/08; H04L 9/32; H04L 9/083
See application file for complete search history.

(56) References Cited

U.S. PATENT DOCUMENTS

| | | | |
|---|---|---|---|
| 6,985,953 B1* | 1/2006 | Sandhu | G06F 21/31 709/229 |
| 2002/0152378 A1 | 10/2002 | Wallace, Jr. | |
| 2006/0212706 A1* | 9/2006 | Jiang | H04L 9/0825 713/176 |
| 2009/0171982 A1 | 7/2009 | Hagan | |

(Continued)

FOREIGN PATENT DOCUMENTS

KR   101358704   2/2014

OTHER PUBLICATIONS

Johns et al., Reliable Protection Against Session Fixation Attacks, 2011, SAC '11 Proceedings of the 2011 ACM Symposium on Applied Computing, pp. 1531-1537. (Year: 2011).*

(Continued)

*Primary Examiner* — Khang Do
(74) *Attorney, Agent, or Firm* — Baker Botts L.L.P.

(57) ABSTRACT

In one embodiment, a method includes a system receiving a request from a user's device, the request being directed to a first host. The system may generate a key, a verification token, and an encrypted key. The system may transmit the verification token and the encrypted key to the device from the first host, and transmit instructions configured to cause (1) the verification token to be stored as a cookie associated with the first host, and (2) the device to transmit the encrypted key to a second host. The system may receive a second request comprising the encrypted key from the device, and decrypt it to obtain the key upon determining that the encrypted key was not previously decrypted. The system may transmit the key to the device from the second host, and instruct the device to store the key as a cookie associated with the second host.

20 Claims, 4 Drawing Sheets

(56) References Cited

U.S. PATENT DOCUMENTS

| | | | |
|---|---|---|---|
| 2010/0262830 A1* | 10/2010 | Kusakawa | G06F 21/77 |
| | | | 713/172 |
| 2011/0214187 A1* | 9/2011 | Wittenstein | H04L 63/1425 |
| | | | 726/25 |
| 2011/0283110 A1* | 11/2011 | Dapkus | G06F 21/577 |
| | | | 713/182 |
| 2014/0101446 A1 | 4/2014 | Lekies | |
| 2014/0101447 A1* | 4/2014 | Lekies | H04L 9/0841 |
| | | | 713/169 |
| 2015/0082029 A1 | 3/2015 | Volchok | |
| 2015/0180850 A1* | 6/2015 | Venkataramana | H04L 63/08 |
| | | | 726/4 |
| 2018/0302406 A1* | 10/2018 | Burckhardt | H04W 4/02 |
| 2018/0351936 A1* | 12/2018 | Battacharya | H04L 63/083 |

OTHER PUBLICATIONS

Ryck et al., Serene: Self-Reliant Client-Side Protection against Session Fixation, 2012, K.M. G"oschka and S. Haridi (Eds.): DAIS 2012, LNCS 7272, pp. 59-72, 2012. (Year: 2012).*
International Search Report and Written Opinion for PCT Application No. PCT/US2017/034682, dated Feb. 9, 2018.
EESR received from EPO for EP Patent Application No. 17202098.4-1218, dated Mar. 14, 2018.

* cited by examiner

SYSTEMS AND METHODS FOR PREVENTING SESSION FIXATION OVER A DOMAIN PORTAL

TECHNICAL FIELD

This disclosure generally relates to systems and methods for improving online security, such as preventing session fixation attacks.

BACKGROUND

An online application, such as a website, may enable people to access the Internet in locations where Internet access via a data plan may be unaffordable. The online application may act like a portal that allows third-party content and service providers to provide content and services to people who otherwise would not be able to access their websites. Any content provided through the online application, including third-party website content, may be provided under the domain of the online application.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments disclosed herein pertain to an online portal (e.g., hosted at 0.fbs.com) that provides people access to Internet services in markets where interne access may be less affordable. Through the portal, third-party websites may be made available for free without incurring data charges. These third-party websites may be treated as subdomains on 0.fbs.com. For example, a third party website hosted at www.3rdparty.com may be made available through the portal from the host www-3rdparty-com.0.fbs.com. Because the third party website is a subdomain, a user's cookies associated with the higher-level domains (e.g., 0.fbs.com) may be vulnerable to attacks from, e.g., client-side scripting language hosted on the third party websites.

To address this security issue, particular embodiments disclosed herein causes a verification token to be stored as a cookie associated with a secure origin separate from the third-party origin, so that the verification token cookie cannot be accessed and/or modified by client-side scripting (which may be malicious) hosted from the third-party origin. In particular embodiments, a user may request to establish a session with the portal. Rather than directly providing the user with the requested session key, the portal's host may redirect the user's browser to a secure origin. The secure origin may, in response to the user's request, provide the user with a verification token, which may be used by the browser to verify the integrity of the session key used in subsequent communications. The verification token may be stored as a cookie associated with the secure origin. The secure origin may further provide the user with an encrypted version of the session key along with a nonce, and redirect the user's browser to a rewrite origin or proxy through which third-party websites are provided on the portal. In particular embodiments, the redirection may cause the encrypted version of the session key and the nonce to be presented to the rewrite origin. If the nonce indicates that the encrypted key has not been decrypted before, the server may decrypt the encrypted session key and return the decrypted session key to the browser for storage. Because of the nonce, the encrypted session key may only be decrypted once. Since only the user or an attacker/hacker—but not both—can obtain the decrypted session key from the server, the user and the attacker/hacker cannot both obtain the same session key, thereby preventing session fixation.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, an online application, such as a portal service provided using one or more web servers, may allow users to access third-party websites. In particular embodiments, access to third-party websites may be provided by the portal through subdomains of the domain of the portal. In particular embodiments, the subdomain of the portal used to host a third-party website may be generated based on the address of the third-party website. As an example, if a portal service provider is hosted at the address 0.fbs.com and a third-party website is hosted at www.3rdparty.com, the portal may make the third-party website available through the address www-3rdparty-com.0.fbs.com. In this example, access to the third-party content is provided through a subdomain of the portal.

In particular embodiments, when a user communicates with the portal, the portal may automatically create a session key (e.g., ICK) to identify the user and/or a session between the user and the portal. The session key may be unique for each user, and may be stored in a cookie on the user's client device (e.g., in a browser on the client device). A client device may be any suitable computing device such as a smartphone, desktop or laptop computer, tablet, wearable device (e.g., smartwatch), or virtual reality headset. The stored cookie may be used in communications between the user device and the portal to identify a session between the two. In particular embodiments, information within that cookie may be associated with a cookie jar on a server of the portal. The cookie jar on the server may be used to store cookies of third-party websites that the user interacts with through the portal. In particular embodiments, the session key may be used to access and/or decrypt the corresponding cookie jar on the server.

In particular embodiments, an attacker may achieve session fixation if the attacker and the user use the same ICK to communicate with the portal. Since the ICK allows a communicating entity (which could be the legitimate user or the attacker) to access the corresponding cookie jar, both the attacker and the user may access the same cookie jar if they both communicate with the portal using the same ICK. Thus, for example, if the server-side cookie jar contains a session cookie between the user and his/her email server, the attacker with the user's ICK would be able to engage in that session since the attacker also has access to the session cookie of the email server. To achieve this, the attacker could, for example, either (1) steal the victim's ICK or (2) implant the attacker's own ICK onto the victim's system so that the victim would use the attacker's ICK to communicate with the server.

In particular embodiments, the ICK may be vulnerable to attacks if it is stored as a cookie that is accessible and/or modifiable to malicious client-side scripts hosted by third-party web pages through the portal. For example, this may occur if the ICK is stored as a cookie associated with a parent domain (e.g., 0.fbs.com) of a subdomain (e.g., www-3rdparty-com.0.fbs.com) assigned by the portal to provide access to a corresponding third-party web page. A malicious third-party website may contain client-side scripts that, when executed on the client device, may manipulate any accessible client-side cookies. Thus, if the ICK is stored as a cookie associated with the parent domain, it may be vulnerable because a browser typically will make a cookie accessible to the given domain used for setting the cookie and any of its subdomains. Thus, if a cookie is associated with 0.fbs.com, it may be accessed by a third-party web page (e.g., via JavaScript) when that page is provided through the portal from a subdomain of 0.fbs.com.

In particular embodiments, session fixation may be prevented by requiring each communication response from the portal to include a verification token, ICKT, derived from an ICK provided in the request. The response's ICKT may then be compared on the client side with a securely stored verification token ICKT to ensure that the integrity of the originally transmitted ICK. As an example, a user who is requesting a third-party web page via the portal may present a locally stored ICK to the portal's server, which may then generate an ICKT using derivation f(ick) and embed it within the returned web page. When loading the returned web page, the receive ICKT may be compared to the previously and securely stored ICKT. A mismatch means that the ICK that was sent in the request has been compromised. In particular embodiments, the ICKT may be derived from the original ICK using a one-way function $f(ick)$ (e.g., HMAC). In particular embodiments, the ICKT may be generated when the ICK is generated, such as when the user initially requests login. Unlike the ICK, the ICKT in particular embodiments may be securely stored on the client device in a location that is unreachable by an attacker, such as in localStorage. Unlike cookies, localStorage, which adheres to the same-origin policy, is separated by origin (each origin has its own separate localStorage), which means that JavaScript in one origin cannot access the localStorage of another origin. As an example, in the context of the portal where third-party websites may be hosted through a rewrite origin, a potential attacker's page hosted through the 3rd-party rewrite origin (e.g., http://3rdparty.rewrite.0.fbs.com) may be different from the ICKT's origin (e.g., http://0.fb-s.com). Consequently, the scripts hosted on the attacker's web page would not be able to access the ICKT because it is securely stored in the localStorage of a different origin. In connection with the use of localStorage to securely store ICKT, particular embodiments may utilize one or more systems, components, elements, functions, methods, operations, or steps disclosed in U.S. patent application Ser. No. 15/425,974, titled "SECURE CONTENT DELIVERY OVER A DOMAIN PORTAL" and filed on 6 Feb. 2017, the content of which is hereby incorporated by reference in its entirety.

Not all web browsers support localStorage, however (e.g., Opera Mini). In particular embodiments, instead of using localStorage as secure storage, ICKT may be stored as a cookie in a manner in accordance with the embodiments described herein so that it is inaccessible to an attacker and cannot be fixated at the time it is issued. At a high level, the ICK and ICKT may be stored as cookies associated with different hosts. To achieve this, in particular embodiments the ICK and ICKT may be separately transmitted to the client device from different hosts via a redirect mechanism. For example, ICK may be associated with the host rewrite.i.org, and ICKT may be associated with a different host secure.0.fbs.com (or www.0.fbs.com). Since rewrite.i.org does not share an ancestor domain with secure.0.fbs.com, JavaScript associated with, e.g., www-3rdparty-com.rewrite.i.org cannot access the ICKT cookie associated with secure.0.fbs.com.

In particular embodiments, transmission of the ICK to the client may be separated from the transmission of the ICKT. In particular embodiments, the ICK key and ICKT verification token may be generated at the same time and neither may be persisted by the server. While the ICK may be transmitted along with the ICKT to the client device at the same time and from the same host, it may be possible that an attacker could intercept the ICKT and the associated ICK. If so, both the user and the attacker would be able to share the session associated with the ICK and access the associated session. To prevent this, the server may not send the ICK directly with the ICKT. In particular embodiments, the server may instead transmit to the user an encrypted ICK, which will be referred to as EICK herein. In particular embodiments, the EICK may be encrypted using a two-way encryption function with a secret encryption key known only to the server. Upon receiving the EICK, the client device may request the server to decrypt the EICK to obtain the ICK. To prevent an attacker from similarly requesting the server to decrypt the same EICK, in particular embodiments the system may bind the EICK to a nonce to restrict the number of times such decryption would be granted (e.g., once). Thus, even if the attacker is able to intercept the EICK and nonce, which the user may also have, only one of the parties (i.e., the attacker or the user, but not both) would be able to successfully request the server to decrypt the EICK due to the nonce. This security measure would prevent the attacker and the user from both using the same ICK/ICKT, thereby preventing session fixation.

Figure 1:
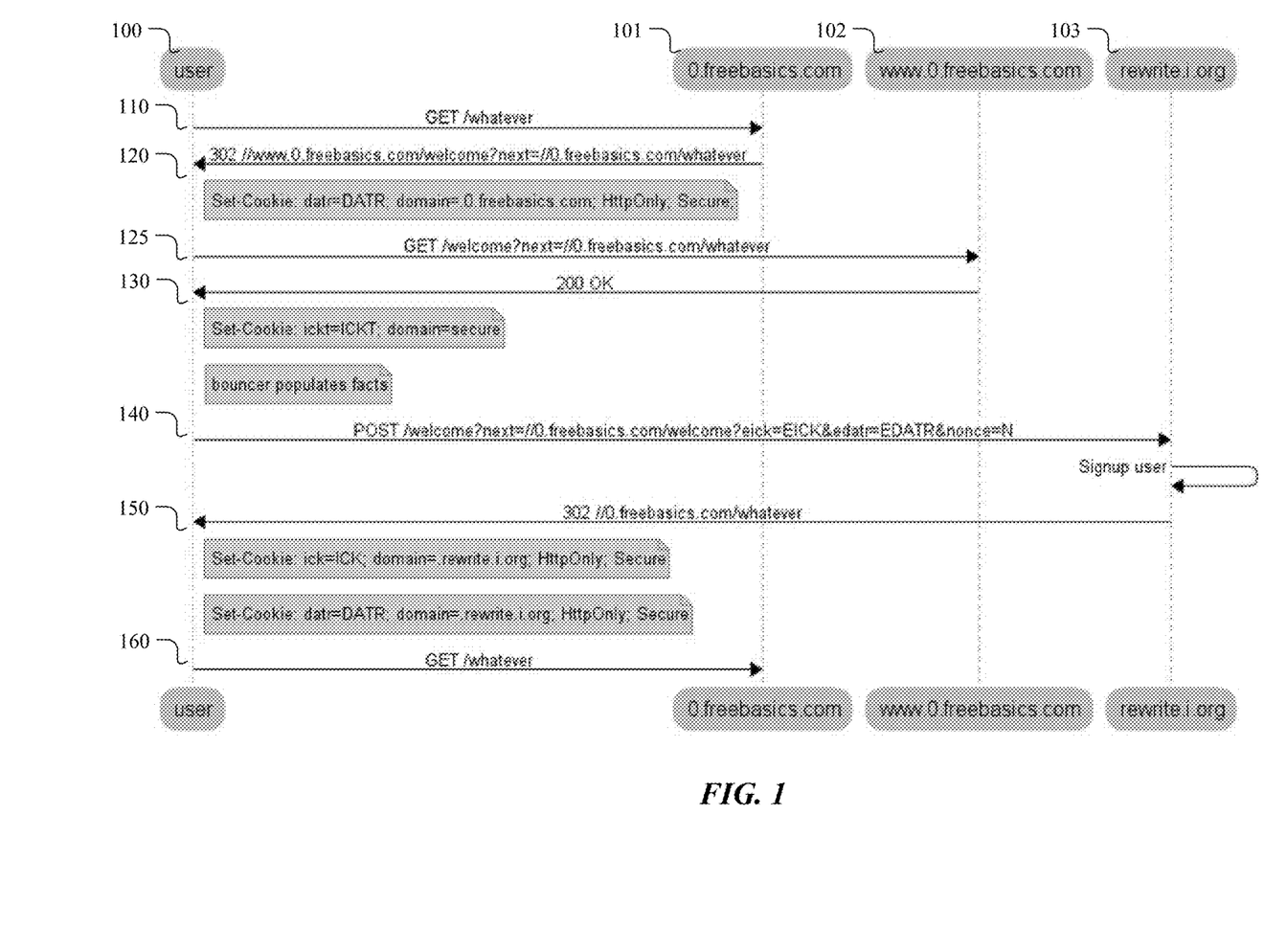
FIG. 1 illustrates an example communication sequence diagram of a user securely establishing a session with a server.

FIG. 1 illustrates an example of a communication sequence diagram of a user establishing a session with a portal in accordance with particular embodiments described herein. The illustrated example shows communication between the user 100 and a portal 101 (e.g., 0.freebasics.com), a secure origin 102 (e.g., www.0.freebasics.com), and a rewrite origin 103 (e.g., rewrite.i.org). As discussed above, the secure origin 102 is secure in terms of its cookies not being accessible to client-side scripts in third-party web pages provided through the rewrite origin 103. In particular embodiments, the secure origin 102 (e.g., www.0.fbs.com or secure.0.fbs.com) may not share a non-public-suffix-list host with the rewrite origin (e.g., rewrite.i.org). As discussed above, the rewrite origin 103 is configured to provide user access to third-party websites. In particular embodiments, the server(s) associated with the portal 101, secure origin 102, and rewrite origin 103 is/are controlled by a common entity.

At step 110, the user 100 in particular embodiments may initiate a login procedure with the portal through his/her web browser or any other type of application capable of communicating with the remote servers associated with the portal. In particular embodiments, the initial request may comprise an HTTP GET request. The user may be shown a welcome screen, a login screen, and/or be asked to accept the portal's 101 terms of service.

At step 120, the portal 101 may respond with a redirection instruction (e.g., using an HTTP response with status code 302) that redirects the user's browser 100 to the secure origin 102.

At step 125, the user's browser 100 may send a request (e.g., HTTP GET) to the secure origin 102 according to the redirection instruction. In particular embodiments, in response to the request, the server associated with the secure origin 102 may generate an ICK key. In particular embodiments, the ICK key may be a random or pseudo-random key that is newly generated each time a user requests to establish a session with the portal. In particular embodiments, the ICK key may not be persisted by the server to facilitate user privacy against cold-accessing the cookie jar associated with the ICK key. It should be appreciated that the ICK key generation is not influenced by anything provided by the requester to further ensure its integrity. In particular embodiments, once the ICK key is generated, the server may also generate an in-transit key associated with the ICK key. In particular embodiments, the in-transit key, which may be referred to as EICK, may be generated by encrypting the ICK key using an encryption function so that EICK=E (SECRET, ICK), where SECRET is a server-side secret key and encryption function E(K, M) represents a symmetric encryption of message M under key K. In particular embodiments, the server may also generate a nonce N, which may only be presented once to the server in subsequent communications to ensure that the EICK is only decrypted once. In particular embodiments, the nonce N may be bound to the EICK so that verification of the nonce N depends on the presentation of the associated EICK (e.g., verification of a nonce may fail if a different EICK is presented with the nonce). Further, in particular embodiments, the server may generate a verification token ICKT, as discussed above. The ICKT token may be derived from the ICK using, e.g., an HMAC function with a secret key or any other one-way function so that the ICK cannot be obtained from the ICKT.

At step 130, the server may send a response from the secure origin 102 to the user 100. The response may include an instruction that causes the user's browser 100 to store the generated ICKT as, e.g., a JavaScript-accessible client-side cookie associated with the secure origin 103. 1. Since the secure origin (e.g., secure.0.fbs.com or www.0.fbs.com) and the rewrite origin (e.g., rewrite.i.org) do not share a non-public-suffix-list host, sites (which may contain malicious code) hosted through the rewrite origin cannot influence, access or shadow cookies associated with the secure origin. While an attacker may be able to purge the cookie using cookie-flooding, but this would cause a new ICK and ICKT to be obtained. In particular embodiments, the ICKT cookie is not set with the HttpOnly flag, which makes it accessible to client-side scripts (e.g., those hosted by the secure origin 102), so that the ICKT may be used by client-side scripts to validate the integrity of an ICK. In particular embodiments, the server may also send the EICK and nonce N to the user 100 through the secure origin 102. It should be appreciated that since the EICK and nonce N may be vulnerable to attacks, sending the encrypted EICK rather than the actual ICK prevents the ICK from being revealed to the attacker at this stage.

At step 140, the user 100 may send the EICK and the nonce N to the rewrite origin 103, requesting it to decrypt the EICK. For example, the EICK and nonce N may be transmitted as query parameters of an URL associated with the rewrite origin 103. Upon receiving the request, the server associated with the rewrite origin 103 may verify whether the request is valid based on the nonce N. For example, the server may check whether the nonce N has already been used before. If the nonce has already been used, the server may block the request and issue an HTTP forbidden response with code 403. The server may also check whether the nonce N is bound to the given EICK, and block the request if the nonce N and the EICK are not bound to each other. This process ensures that any given EICK can only be decrypted by the server once, which in turn ensures that only one requesting party can obtain the decrypted ICK from the server. If the server determines that the nonce N is bound to the EICK and it has never been used, then the server may mark the nonce as being used and recover the ICK from the EICK using, e.g., ICK=D(SECRET, EICK), where SECRET represents the secret encryption key discussed above and D(K, M) represents a symmetric decryption of message M under key K.

At step 150, the server associated with the rewrite origin 103 may send a response to the user 100 with the ICK. In particular embodiments, the response may include instructions that cause the user's browser 100 to store the ICK as a cookie associated with the rewrite origin 103. The ICK may be stored as an HttpOnly cookie so that it cannot be accessed by client-side scripts. In particular embodiments, the server may also send the user 100 a redirection instruction (e.g., HTTP response with code 302) that causes the user's browser 100 to resume communication with the portal 101 (e.g., step 160).

By redirecting the user 100 to request for the ICKT and ICK from different origins, in particular embodiments the ICKT and ICK cookies are associated with different hosts (e.g., the ICKT is associated with the secure origin 102 and the ICK is associated with the rewrite origin 103). Even if an attacker may control the ICK associated with the rewrite origin 103, the attacker would not be able to use the ICK as a ICK-fixation vector because it would not match the ICKT. For example, let us assume that the attacker can control EICK and nonce N (e.g., by stealing the user's EICK and N or causing the user to use the attacker's EICK and N). If the attacker wishes to know the corresponding ICK, it must either (a) break the encryption of EICK (which is unlikely) to obtain ICK directly without asking the server to decrypt it; or (b) ask the server to decrypt the EICK. Since the server only decrypts an EICK once (due to the nonce N), either the attacker or the user can get the ICK, but not both. For instance, if the attacker asks the server to decrypt first (e.g., either the user's EICK or the attacker's EICK), the server will deny the user's subsequent request. On the other hand, if the user decrypts first and the attacker attempts to decrypt thereafter, the server will deny the attacker's subsequent request. Thus, the attacker would not be able to achieve session fixation, which requires the same ICK to be used by both the attacker and the user. Further, it is extremely unlikely that by pure chance the same ICK would be randomly generated for both the attacker and the user.

Figure 2:
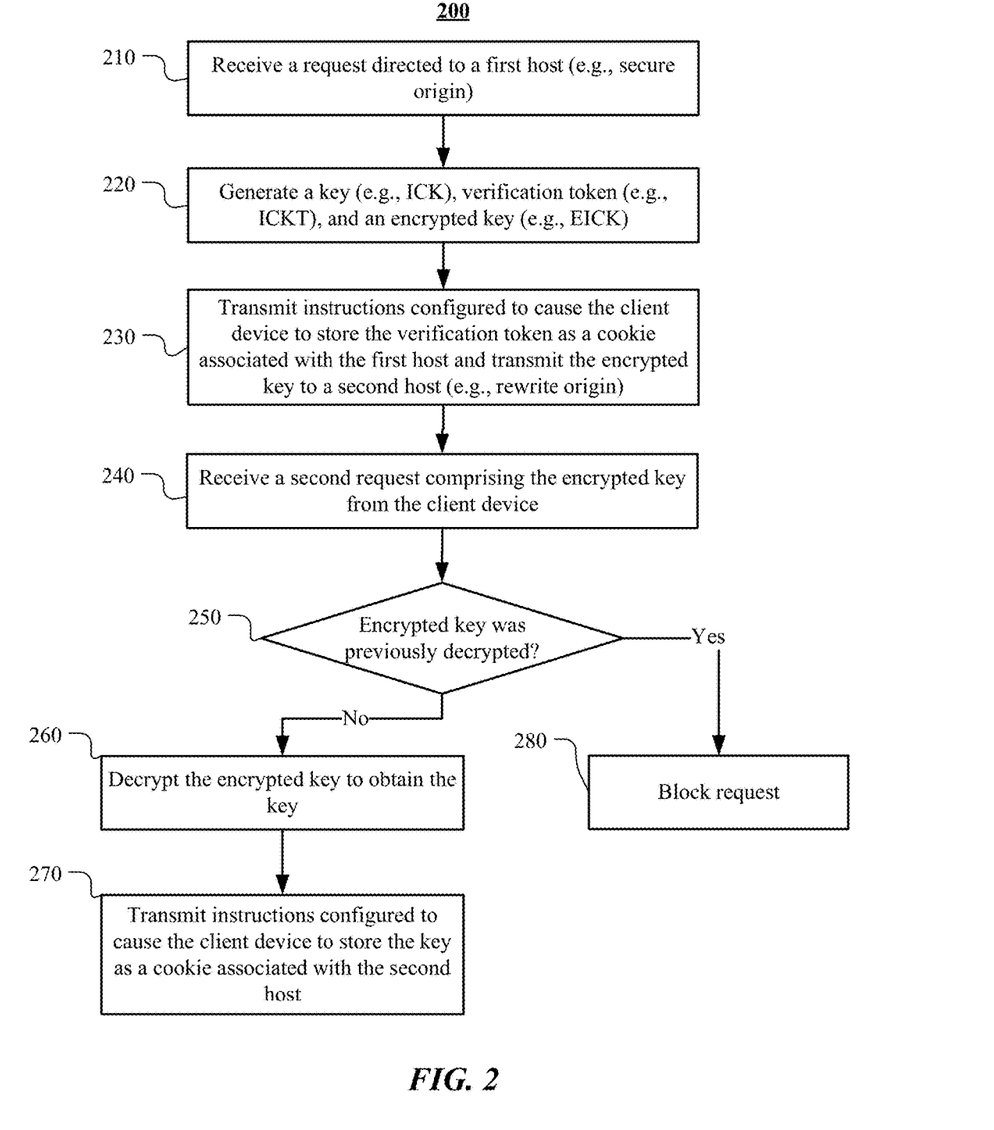
FIG. 2 illustrates an example method for securely establishing a session with a server.

FIG. 2 illustrates an example method 200 for securely establishing a session with a server. The method may begin at step 210, where a computing system may receive a first request from a client device associated with a user. The first request may be directed to a first host (e.g., secure origin) associated with the computing system. At step 220, the system in response to the first request may generating a key, a verification token based on the key, and an encrypted key based on the key. At step 230, the system may transmit first instructions, the verification token, and the encrypted key to the client device from the first host associated with the computing system. The first instructions may be configured to cause the verification token to be stored as a first cookie on the client device, with the first cookie being associated with the first host. The first instructions may also be configured to cause the client device to transmit the encrypted key to a second host (e.g., rewrite origin) associated with the computing system. At step 240, the system may receive a second request comprising the encrypted key from the client device. At step 250, the system may determine whether the encrypted key was previously decrypted. At step 260, upon determining that the encrypted key was not previously decrypted, the system may decrypt the received encrypted key to obtain the key. Then at step 270, the system may transmit second instructions and the key obtained from the decryption to the client device from the second host. The second instructions may be configured to cause the key obtained from the decryption to be stored as a second cookie on the client device, with the second cookie being associated with the second host. If instead the system determined that the key was previously decrypted at step 250, then at step 280 the system may block the user's request. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for securely establishing a session with a server including the particular steps of the method of FIG. 2, this disclosure contemplates any suitable method for securely establishing a session with a server, including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
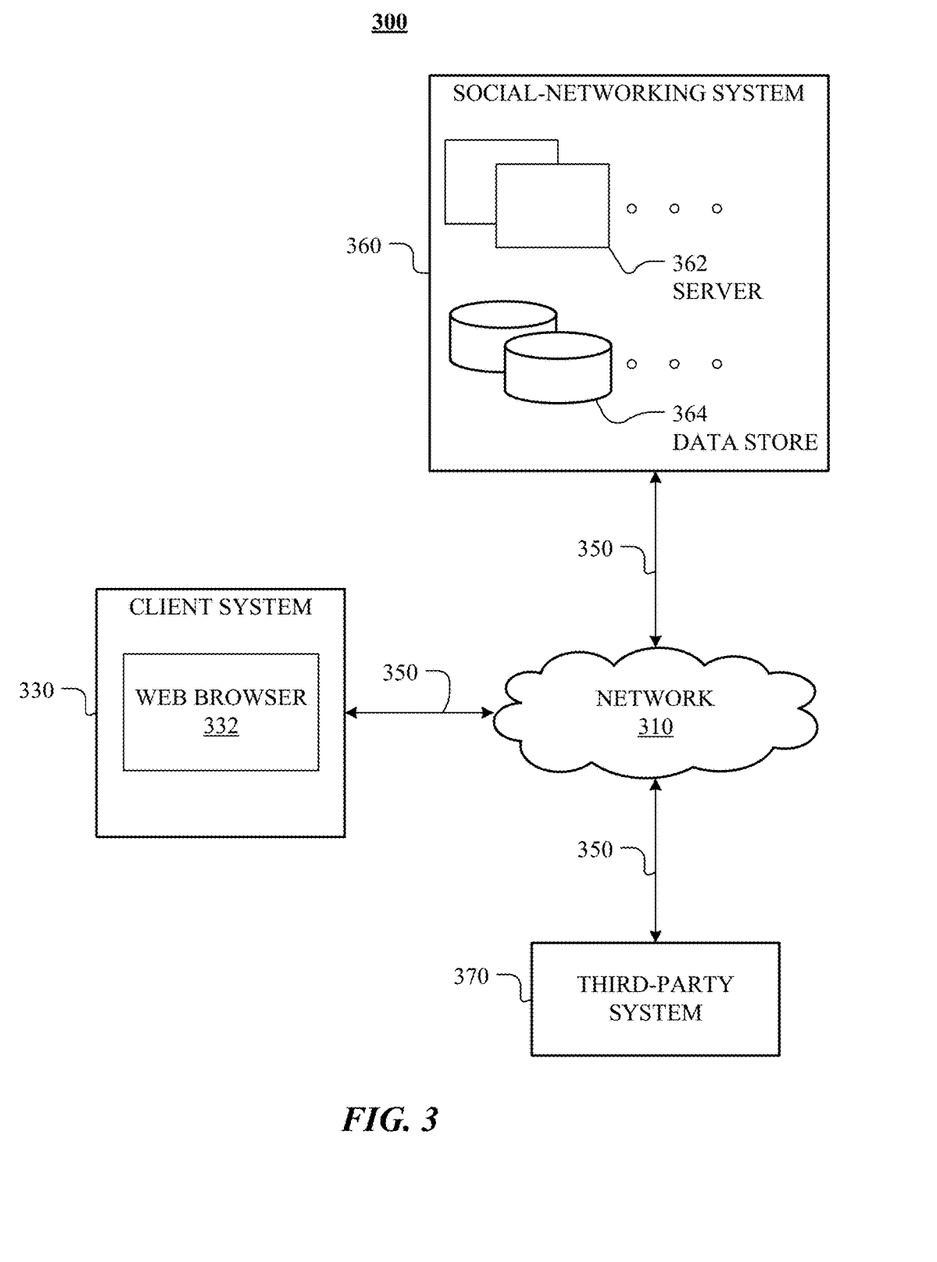
FIG. 3 illustrates an example network environment.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
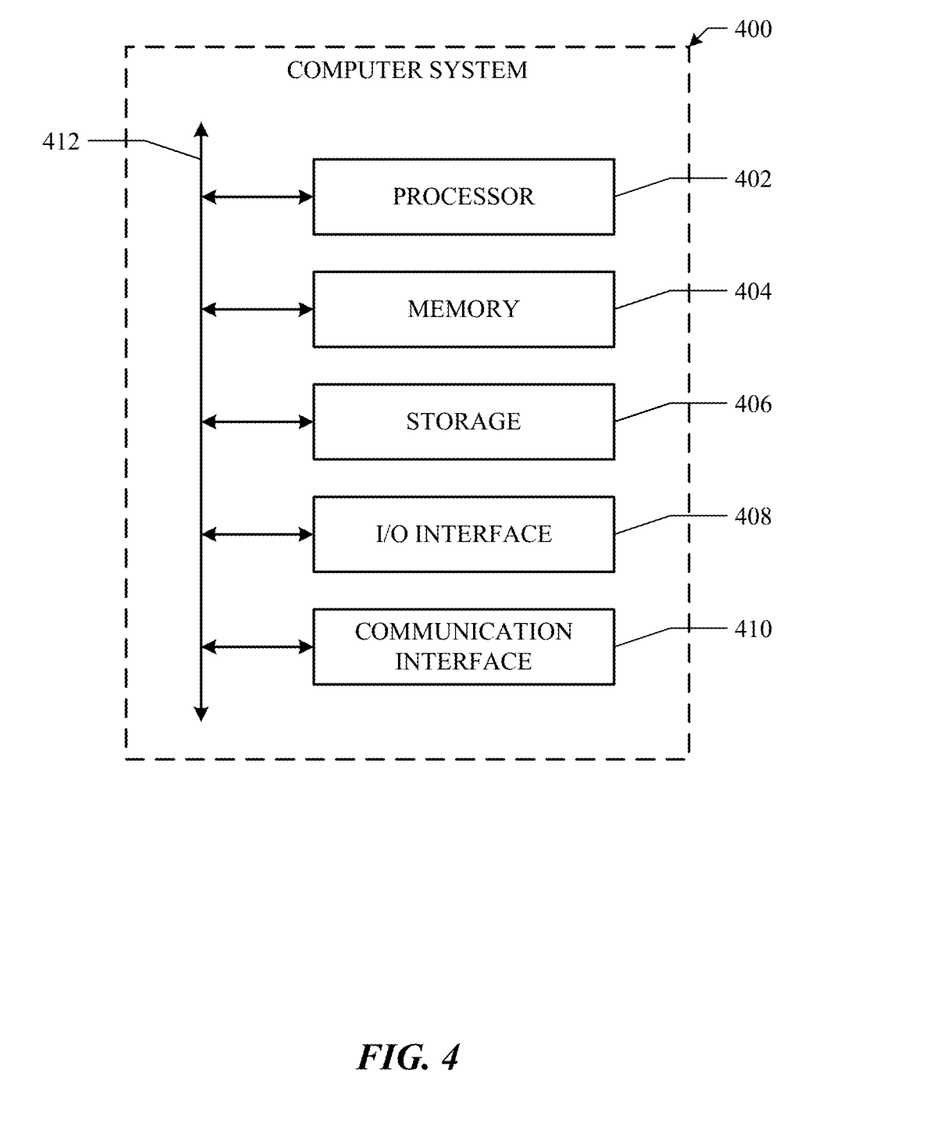
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing system, receiving a first request from a client device associated with a user, the first request being directed to a first host associated with the computing system;
    by the computing system, generating a key in response to the first request;
    by the computing system, generating a verification token based on the key;
    by the computing system, generating an encrypted key based on the key;
    by the computing system, transmitting first instructions, the verification token, and the encrypted key to the client device from the first host associated with the computing system, the first instructions being configured to:
        cause the verification token to be stored as a first cookie on the client device, the first cookie being associated with the first host; and
        cause the client device to transmit the encrypted key to a second host associated with the computing system;
    by the computing system, receiving a second request comprising the encrypted key from the client device;
    by the computing system, decrypting the received encrypted key to obtain the key upon determining that the encrypted key was not previously decrypted; and
    by the computing system, transmitting second instructions and the key obtained from the decryption to the client device from the second host, the second instructions being configured to cause the key obtained from the decryption to be stored as a second cookie on the client device, the second cookie being associated with the second host.

2. The method of claim 1, further comprising:
by the computing system, receiving from the client device a prior request, wherein the prior request is directed to a third host associated with the computing system and is received before the first request is received; and
by the computing system, transmitting a redirection instruction to the client device in response to the prior request, the redirection instruction being configured to cause the client device to send the first request to the first host.

3. The method of claim 1, further comprising:
by the computing system, generating a nonce; and
by the computing system, transmitting the nonce to the client device;
wherein the first instructions is configured to cause the client device to transmit the nonce with the encrypted key to the second host associated with the computing system; and
wherein the determining that the encrypted key was not previously decrypted is based on the nonce.

4. The method of claim 3, further comprising:
by the computing system, receiving a third request from a second client device associated with a second user, the third request comprising the encrypted key and the nonce;
by the computing system, determining that (1) the nonce was previously used or (2) the nonce is not bound to the encrypted key; and
by the computing system, rejecting the third request.

5. The method of claim 1, wherein the first cookie is configured to be accessible by client-side scripts, wherein the second cookie configured to be inaccessible by client-side scripts.

6. The method of claim 1, wherein the first host and the second host are different.

7. The method of claim 1, wherein the second host is configured to provide access to a web page hosted by a third-party.

8. The method of claim 1, further comprising:
by the computing system, receiving a third request from the client device comprising the key stored as the second cookie;
by the computing device, generating a second verification token based on the key received with the third request; and
by the computing device, transmitting a web page in response to the third request to the client device, the web page comprising the second verification token and instructions configured to cause the client device to:
compare the second verification token with the verification token stored as the first cookie; and
determine whether to render the web page based on the comparison.

9. One or more computer-readable non-transitory storage media embodying software that is operable when executed to:
receive a first request from a client device associated with a user, the first request being directed to a first host associated with a computing system;
generate a key in response to the first request;
generate a verification token based on the key;
generate an encrypted key based on the key;
transmit first instructions, the verification token, and the encrypted key to the client device from the first host associated with the computing system, the first instructions being configured to:
cause the verification token to be stored as a first cookie on the client device, the first cookie being associated with the first host; and
cause the client device to transmit the encrypted key to a second host associated with the computing system;
receive a second request comprising the encrypted key from the client device;
decrypt the received encrypted key to obtain the key upon determining that the encrypted key was not previously decrypted; and
transmit second instructions and the key obtained from the decryption to the client device from the second host, the second instructions being configured to cause the key obtained from the decryption to be stored as a second cookie on the client device, the second cookie being associated with the second host.

10. The media of claim 9, wherein the software is further operable when executed to:
receive from the client device a prior request, wherein the prior request is directed to a third host associated with the computing system and is received before the first request is received; and
transmit a redirection instruction to the client device in response to the prior request, the redirection instruction being configured to cause the client device to send the first request to the first host.

11. The media of claim 9, wherein the software is further operable when executed to:
generate a nonce; and
transmit the nonce to the client device;
wherein the first instructions is configured to cause the client device to transmit the nonce with the encrypted key to the second host associated with the computing system; and
wherein the determining that the encrypted key was not previously decrypted is based on the nonce.

12. The media of claim 11, wherein the software is further operable when executed to:
receive a third request from a second client device associated with a second user, the third request comprising the encrypted key and the nonce;
determine that (1) the nonce was previously used or (2) the nonce is not bound to the encrypted key; and
reject the third request.

13. The media of claim 9, wherein the second host is configured to provide access to a web page hosted by a third-party.

14. The media of claim 9, wherein the software is further operable when executed to:
receive a third request from the client device comprising the key stored as the second cookie;
generate a second verification token based on the key received with the third request; and
transmit a web page in response to the third request to the client device, the web page comprising the second verification token and instructions configured to cause the client device to:
compare the second verification token with the verification token stored as the first cookie; and
determine whether to render the web page based on the comparison.

15. A computing system comprising:
one or more processors; and one or more computer-readable non-transitory storage media coupled to one or more of the processors and comprising instructions operable when executed by one or more of the processors to cause the system to:
receive a first request from a client device associated with a user, the first request being directed to a first host associated with the computing system;
generate a key in response to the first request;
generate a verification token based on the key;
generate an encrypted key based on the key;
transmit first instructions, the verification token, and the encrypted key to the client device from the first host associated with the computing system, the first instructions being configured to:
 cause the verification token to be stored as a first cookie on the client device, the first cookie being associated with the first host; and
 cause the client device to transmit the encrypted key to a second host associated with the computing system;
receive a second request comprising the encrypted key from the client device;
decrypt the received encrypted key to obtain the key upon determining that the encrypted key was not previously decrypted; and
transmit second instructions and the key obtained from the decryption to the client device from the second host, the second instructions being configured to cause the key obtained from the decryption to be stored as a second cookie on the client device, the second cookie being associated with the second host.

16. The system of claim 15, wherein the processors are further operable when executing the instructions to:
receive from the client device a prior request, wherein the prior request is directed to a third host associated with the computing system and is received before the first request is received; and
transmit a redirection instruction to the client device in response to the prior request, the redirection instruction being configured to cause the client device to send the first request to the first host.

17. The system of claim 15, wherein the processors are further operable when executing the instructions to:
generate a nonce; and
transmit the nonce to the client device;
wherein the first instructions is configured to cause the client device to transmit the nonce with the encrypted key to the second host associated with the computing system; and
wherein the determining that the encrypted key was not previously decrypted is based on the nonce.

18. The system of claim 17, wherein the processors are further operable when executing the instructions to:
receive a third request from a second client device associated with a second user, the third request comprising the encrypted key and the nonce;
determine that (1) the nonce was previously used or (2) the nonce is not bound to the encrypted key; and
reject the third request.

19. The system of claim 15, wherein the second host is configured to provide access to a web page hosted by a third-party.

20. The system of claim 15, wherein the processors are further operable when executing the instructions to:
receive a third request from the client device comprising the key stored as the second cookie;
generate a second verification token based on the key received with the third request; and
transmit a web page in response to the third request to the client device, the web page comprising the second verification token and instructions configured to cause the client device to:
 compare the second verification token with the verification token stored as the first cookie; and
 determine whether to render the web page based on the comparison.

* * * * *